Sept. 26, 1967  J. B. POPPER  3,343,426
COOPERATING WEDGES INCLUDING MATING WORMS
Filed Oct. 21, 1965  4 Sheets-Sheet 1
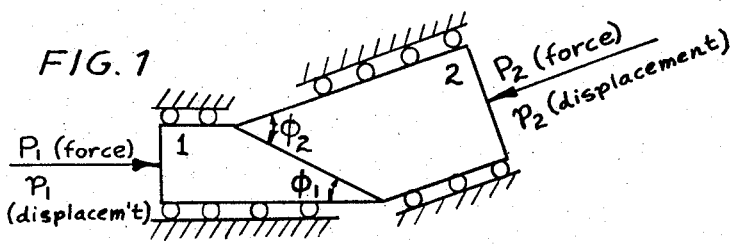
FIG. 1
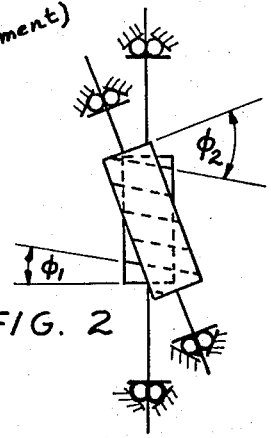
FIG. 2
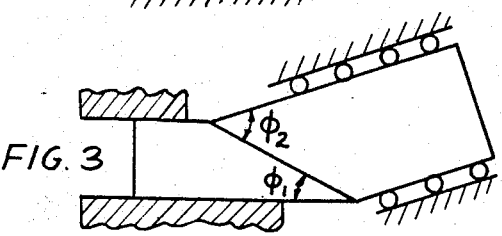
FIG. 3
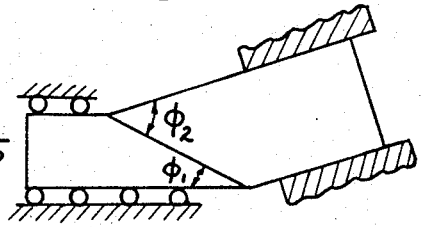
FIG. 5
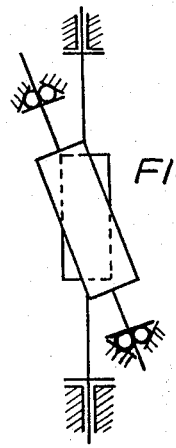
FIG. 4
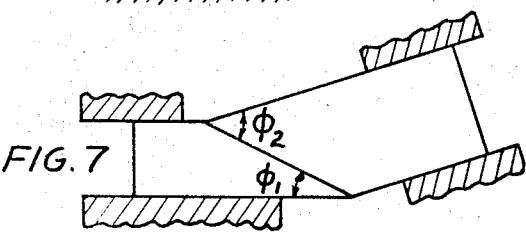
FIG. 7
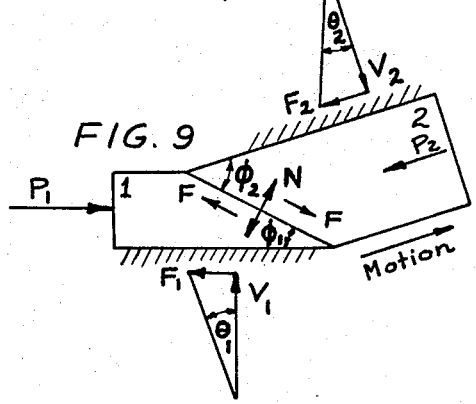
FIG. 9
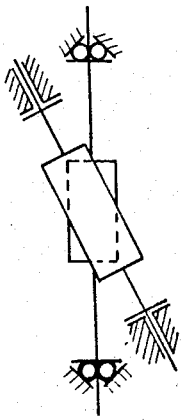 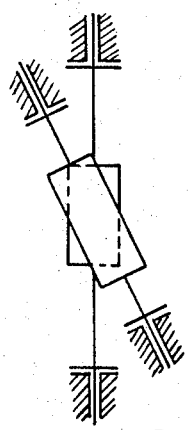
FIG. 6  FIG. 8
INVENTOR.
Jahlin Boas Popper Sept. 26, 1967     J. B. POPPER     3,343,426
COOPERATING WEDGES INCLUDING MATING WORMS
Filed Oct. 21, 1965     4 Sheets-Sheet 3

INVENTOR.
Jahhim Boas Popper

United States Patent Office 3,343,426
Patented Sept. 26, 1967

3,343,426
COOPERATING WEDGES INCLUDING
MATING WORMS
Jakhin Boas Popper, Kiryat Motzkin, Israel, assignor to
Twinworm Associates, Philadelphia, Pa., a partnership
Filed Oct. 21, 1965, Ser. No. 499,566
41 Claims. (Cl. 74—424.5)

The present invention relates in its broader aspects to cooperating wedges, and includes mating worms. The invention in one aspect includes self-locking or one-way motion gears, in which the function of the driving and the driven gears is not interchangeable. The present invention is an improvement of the invention described in U.S. Patent No. 2,973,660.

A purpose of the present invention is to provide self-locking gears which have a higher efficiency.

A further purpose is to reduce the axial side thrust which is produced by such gears.

A further purpose is to design gear drives which do not require the use of expensive antifriction bearings.

A further purpose is to provide self-locking without large reduction ratios.

A further purpose is to provide a gear combination which is almost self-locking, with a view to minimize the transmission of vibration and shock back through the gear train.

A further purpose is to produce a worm combination which exhibits certain self-locking characteristics when revolving in one direction, but different self-locking characteristics when revolving in the other direction.

A further purpose is to obtain the characteristics already discussed in respect to gears in the form of cooperating wedges or cooperating wedge surfaces, which can be utilized to provide self-locking interaction between reciprocating members or between a rotary member and a reciprocating member, while at the same time securing very high efficiency.

Further purposes appear in the specification and in the claims.

In the drawings I have chosen to illustrate a few embodiments of the invention, choosing the form shown from the standpoints of convenience in illustration, satisfactory operation, and clear demonstration of the principles involved.

FIGURE 1 is a diagram of two inclined planes useful in explaining the principles of the invention described in U.S. Patent No. 2,973,660.

FIGURE 2 is a diagram of two mating worms, to assist in the explanation.

FIGURE 3 is a diagram of two inclined planes showing one form of the present invention.

FIGURE 4 is a diagram of two mating worms, to assist in the explanation.

FIGURE 5 is a diagram of two inclined planes showing a second form of the present invention.

FIGURE 6 is a diagram of two mating worms, to assist in the explanation.

FIGURE 7 is a diagram of two inclined planes showing a third form of the present invention.

FIGURE 8 is a diagram of two mating worms, to assist in the explanation.

FIGURE 9 is a diagram of two inclined planes showing the various forces that must be considered in analyzing the devices shown in FIGURES 7 and 8.

Figure 11:
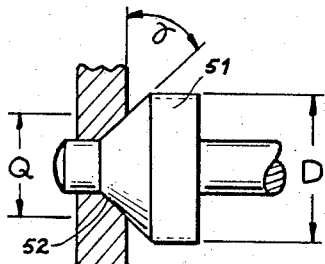
FIGURE 11 shows a thrust bearing arrangement useful for artificially increasing the reflected coefficient of bearing friction.

In the drawings in the various cases, only a few of the many worm threads have been shown, adopting the well recognized convention.

As well known in the art, self-locking gears usually comprise a worm in mesh with a worm wheel, with their axes at right angles to one another. This common form has a number of drawbacks. The efficiency is very low, usually being about 30% to 45%, and never exceeding 50%. It is furthermore frequently found that the wear on such gears is considerable, due to the high sliding velocity between worm thread and wheel teeth.

Among the purposes of U.S. Patent No. 2,973,660 is elimination of the above-mentioned disadvantages. The above-named patent describes a worm drive consisting of two mating worms placed almost parallel to each other, and also explains that the pitch angles of the two worms must be chosen according to certain rules in order to obtain a worm drive which possesses self-locking and, at the same time, operates with a high efficiency. The invention of the above-named patent is further described and analyzed in the article entitled "For Self-Locking at High Efficiency . . . The Twinworm Gear" by N. Chironis, published in the January 18, 1960 issue of "Product Engineering," and also in the article "The Twinworm Drive—A Self-Locking Worm-Gear Transmision of High Efficiency" by B. Popper and D. W. Pessen, published in the August 1960 issue of the "Journal of Engineering for Industry," and awarded the 1960 Blackall Machine Tool and Gage Award by the American Society of Mechanical Engineers.

The invention described in the above-named patent and articles has proved to be very successful in overcoming the disadvantages of prior-art self-locking worm gears. However, it suffers from a drawback of its own, namely that the axial thrust produced by the worm-gear combination can reach extremely high values under certain conditions, as will be shown later by means of a mathematical analysis. This high axial thrust imposes high stresses on the supporting bearings, as well as on the worm threads themselves. One of the purposes of the present invention is to overcome this drawback, i.e., to produce self-locking with a high efficiency, and at the same time to produce low values of axial thrust.

In the invention described in U.S. Patent No. 2,973,660, two worms are mounted almost parallel to each other. In order to reduce friction as much as possible, the worms, according to the above invention, were preferably mounted in antifriction bearings (i.e., roller or ball bearings) to absorb the radial and axial loads. Thus, in the analysis made in the above mentioned patent, the bearing friction was assumed zero, and the only friction considered was that acting at the contact surfaces of the two mating worm threads. According to the present invention, a certain amount of friction is deliberately introduced at the bearings of the driving worm, or at the bearings of the driven worm, or, if necessary, at the bearings of both worms. This is accomplished simply by replacing the antifriction bearings with properly-designed sliding bearings. To obtain good results, the effective friction coefficients at these bearings must be controlled and kept within certain ranges. As will be shown below, it is possible to control these effective friction coefficients by proper design of the supporting bearings. By proper choice of the worm pitch angles and the effective friction coefficients at the bearings, it is possible to reduce drastically the axial thrust produced by the worms, and even to obtain higher efficiencies than are possible where the worms are mounted in antifriction bearings.

In accordance with the present invention, when self-locking of gears is desired, two worms, one with left-hand thread and the other with right-hand thread, are associated so that the tangent of the pitch angle of the worm threads on the driving worm is less than the sum of the coefficient of friction between the two worm threads and the coefficient of friction of the driving worm bearing as reflected at the worm threads. In order to obtain so-called second-order self-locking, the tangent of the pitch angle of the worm threads on the driven worm is made less than the difference between the coefficient of friction between the two worm threads and the coefficient of friction of the driven worm bearing as reflected at the worm threads. If the pitch angle of the driven worm is made larger than permitted by the above requirement, ordinary self-locking will result. If the pitch angle of the driven worm is made too large, the efficiency of the worm drive will drop. In general, the pitch angle of the driving worm should be greater than the pitch angle of the driving worm by an amount not exceeding 15 degrees, and for high efficiency preferably by an amount not exceeding 10 degrees.

The term "worm" is used here in its widest and most general sense. Thus, the principles of the present invention can also be applied to constructions which are analogous to internal gears, helical gears, bevel gears, gear and rack combinations, and sliding wedges, just as the invention described in U.S. Patent No. 2,973,660 was applied to those forms.

*Fore equations for inclined plane transmission*

The problem of analyzing the forces transmitted by meshing gears or screw threads can be simplified by considering only small contacting elements of surface of the meshing gears. The problem then reduces itself to the analysis of two inclined planes sliding one to the other. The generalized problem is represented in FIGURE 1. The two planes are sliding freely, with the only friction being at the contact face between the two planes. The friction coefficient is denoted by $f$. The contact face makes angles of $\phi_1$ and $\phi_2$ respectively with the direction of motion of the planes. The driving and opposing forces are denoted by $P_1$ and $P_2$, and the respective displacements by $p_1$ and $p_2$. I arbitrarily define the forces and displacements as positive if they act in the directions of the respective arrows.

In order to help visualize the connection between the sliding planes and the gears, FIGURE 2 shows two worm gears in mesh with each other. The angles $\phi_1$ and $\phi_2$ here represent the respective pitch angles of the two worms. The angle between the two worm shafts is substantially equal to $\phi_2 - \phi_1$ for proper mesh. It is evident that the sliding planes of FIGURE 1 are a schematic and analogous representation of the system of FIGURE 2. The worms of FIGURE 2 are supported by antifriction bearings, so that the only friction appears at the contact points between the two worm threads. This system is analyzed in great detail in the above-mentioned U.S. Patent No. 2,973,660, where the conditions for self-locking and the equations for the efficiency are derived.

If I now deliberately introduce friction at the guiding surfaces of the wedge 1, I obtain the combination shown in FIGURE 3. The analogous worm combination is shown in FIGURE 4. It is seen that the antifriction bearings supporting the worm 1 have been replaced by sliding bearings having an effective friction coefficient which I denote by $f_1$.

If I deliberately introduce friction at the guiding surfaces of the wedge 2, I obtain the combination shown in FIGURE 5. The analogous worm combination is shown in FIGURE 6. Here, the antifriction bearings supporting the worm 2 have been replaced by sliding bearings having an effective friction coefficient which I denoted by $f_2$.

If I deliberately introduce friction at the guiding surfaces of both wedges 1 and 2, I obtain the combination shown in FIGURE 7. The analogous worm combination is shown in FIGURE 8. Here, all antifriction bearings have been replaced by sliding bearings.

In order to obtain good performance characteristics according to the invention, the friction coefficients $f_1$ and $f_2$ must be properly controlled. It must be realized that these coefficients are usually not equal to each other, and are usually also not equal to the friction coefficient $f$ acting between the worm threads. Referring to FIGURE 11, we have a worm 51 supported in a conically-shaped thrust-bearing surface 52. This thrust surface makes an angle $\gamma$ with the vertical. The average diameter of the thrust surface is Q, while the worm diameter is D. Assuming that the real friction coefficient between the worm and thrust surface materials is $f_r$, then the effective friction coefficient felt at the worm periphery due to the bearing friction is equal to $$f = \frac{f_r}{\cos \gamma} \times \frac{Q}{D} \qquad (1)$$

If the worm under consideration is the input worm 1, then this coefficient as given by Equation (1) will represent $f_1$. In the claims attached to this specification, this $f_1$ will be referred to as the "reflected coefficient of input-element bearing friction at the input wedge surface" or as the "reflected coefficient of input-worm bearing friction at the input worm threads." On the other hand, if the worm under consideration is the output worm 2, then the coefficient given by Equation (1) will represent $f_2$. In the claims, this $f_2$ will be referred to as the "reflected coefficient of output-element bearing friction at the output wedge surface" or as the "reflected coefficient of output-worm bearing friction at the output worm threads."

Figure 12:
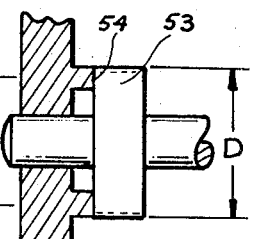
FIGURE 12 shows another bearing arrangement useful for artificially increasing the reflected coefficient of bearing friction.

By controlling the diameter Q of the thrust surface and also the angle $\gamma$, the coefficients $f_1$ and $f_2$ can each be individually adjusted according to the specific needs of the design. By increasing the angle $\gamma$, larger values of $f$ can be obtained. An alternate arrangement is shown in FIGURE 12, where a thrust surface 54 bears against the edge of the worm 53. In this arrangement, the angle $\gamma=0$, and a high value of $f$ is obtained by making the average thrust diameter Q as large as possible. If even larger values of $f$ are required, the arrangement of FIGURE 18 can be used. Here, a gear 55 is connected to a shaft 56 rigidly joined to a friction disc 57. This disc has a conically shaped outer surface which engages a similar conically shaped bearing surface 59. The average thrust surface diameter Q is in this case very large, much larger than the gear diameter D, thus resulting in a very high value of $f$.

Figure 13:
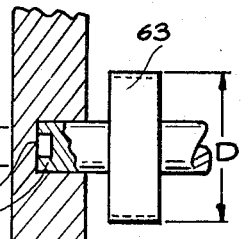
FIGURE 13 shows a bearing arrangement useful for artificially decreasing the reflected coefficient of bearing friction.
Figure 15:
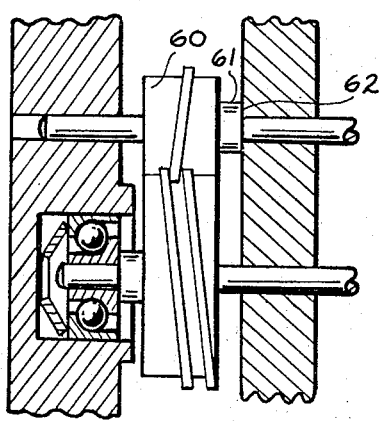
FIGURE 15 is an elevation in section of a worm combination according to a second form of the invention.

If, on the other hand, low values of $f$ are required, the arrangement of FIGURE 15 can be used, where worm 60 adjoins a simple shoulder 61 which bears against the bearing surface 62. If even smaller values of $f$ are desired, the arrangement of FIGURE 13 is suitable, showing a worm 63 whose shaft has a small lip 64 which bears against a thrust surface 65. The thrust surface diameter Q is in this case extremely small, much smaller than the gear diameter D.

In addition to the friction at the thrust surfaces, there is also some friction at the radial bearings, provided these are ordinary sliding bearings and not anti-friction bearings. This friction produces a small increase in the effective values of $f_1$ or $f_2$. Very often, this increase can be neglected in the calculations, but, if it is desired to take this effect into account, it can be calculated from the following equation $$f_{additional} = \frac{d}{L}\left(1 + \frac{L}{D}\tan a\right)f_r \quad (1')$$

where $d$ is the bore of the radial bearing, $L$ is the distance between the radial bearings, $D$ is the worm diameter, and $a$ is the pressure angle of the worm tooth profile.

FIGURE 9 shows all the forces that must be considered in analyzing the wedge system shown in FIGURE 7. $V_1$ and $V_2$ are the normal reactions at the two thrust surfaces, and $F_1$ and $F_2$ are the friction forces at these thrust surfaces due to the friction coefficients $f_1$ and $f_2$ respectively, as calculated from the relation $F=fV$. Assuming that the input force $P_1$ is large enough to overcome the opposing load $P_2$, motion will take place in the direction of the arrow, and the friction forces will be as shown. If motion in the opposite direction should occur, then the directions of $F_1$ and $F_2$ will of course be reversed. The friction coefficient $F_1$ defines a friction angle $\theta_1=\text{arc tan } f_1$, and similarly $f_2$ defines a friction angle $\theta_2=\text{arc tan } f_2$.

At the wedge surfaces, there is a normal reaction N and a friction force $F=fN$. In the case of worm threads, the friction coefficient $f$ is given by $f_r/\cos a$, where $a$ is the pressure angle of the worm tooth profile, as already defined for Equation (1'). In the case of the wedges of FIGURE 9, $\cos a=1$, so that $f=f_r$. The friction coefficient $f$ defines a friction angle $\theta=\text{arc tan } f$.

Figure 10:
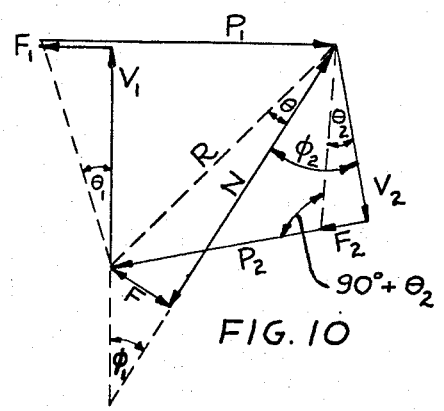
FIGURE 10 is a vector diagram of the various forces shown in FIGURE 9, useful in deriving the equations that describe the present invention.

For convenience in deriving the force equations, the various vectors of FIGURE 9 are combined in a single vector diagram as shown in FIGURE 10.

Taking wedge 1 as a free body, and considering all force components acting on it in the $V_1$ direction:

$$V_1 = N \cos \phi_1 - F \sin \phi_1$$
$$= N(\cos \phi_1 - f \sin \phi_1) \quad (2)$$

Considering the components in the $P_1$ direction:

$$P_1 = F_1 + F \cos \phi_1 + N \sin \phi_1$$
$$= f_1 V_1 + N(\sin \phi_1 + f \cos \phi_1) \quad (3)$$

Substituting (2) into (3):

$$P_1 = f_1 N(\cos \phi_1 - f \sin \phi_1) + N(\sin \phi_1 + f \cos \phi_1)$$
$$= N \sin \phi_1 (1 - ff_1) + N \cos \phi_1 (f+f_1) \quad (4)$$

Taking now wedge 2 as a free body, and considering all force components acting on it in the $V_2$ direction:

$$V_2 = N \cos \phi_2 - F \sin \phi_2$$
$$= N(\cos \phi_2 - f \sin f_2) \quad (5)$$

Considering the components in the $P_2$ direction:

$$P_2 = -F_2 + F \cos \phi_2 + N \sin \phi_2$$
$$= -f_2 V_2 + N(\sin \phi_2 + f \cos \phi_2) \quad (6)$$

Substituting (5) into (6):

$$P_2 = -f_2 N(\cos \phi_2 - f \sin \phi_2) + N(\sin \phi_2 + f \cos \phi_2)$$
$$= \sin \phi_2 (1+ff_2) + N \cos \phi_2 (f-f_2) \quad (7)$$

Dividing (4) by (7):

$$\frac{P_1}{P_2} = \frac{\sin \phi_1 (1-ff_1) + \cos \phi_1 (f+f_1)}{\sin \phi_2 (1+ff_2) + \cos \phi_2 (f-f_2)} \quad (8)$$

There are three possible cases of motion:

Case I: $P_1$ tends to drive the mechanism against $P_2$.
Case II: $P_2$ tends to drive the mechanism against $P_1$.
Case III: $P_1$ and $P_2$ together tend to drive the mechanism in the direction of $-p_1$, against the friction forces set up within the mechanism.

The vectors of FIGURES 9 and 10 and the above Equations (2) to (8) apply for Case I only. For Cases II and III, the motion is reversed, so that all friction forces act in the opposite direction. Instead of drawing new figures and going through the above derivation again, it is usually possible to obtain the result for Cases II and III directly by changing the sign of $f$, $f_1$ and $f_2$ wherever these appear. Equation (8) then becomes $$\frac{P_1}{P_2} = \frac{\sin \phi_1 (1-ff_1) - \cos \phi_1 (f+f_1)}{\sin \phi_2 (1+ff_2) - \cos \phi_2 (f-f_2)} \quad (9)$$

*Conditions for self-locking*

If $P_2$ tends to be the driver (Case II), the condition for self-locking is $P_2=\infty$. This will occur if the numerator of Equation (9) becomes zero. I call such self-locking ordinary or first-order self-locking, and it occurs whenever $$\tan \phi_1 \leq (f+f_1)/(1-ff_1) \approx f+f_1 \quad (10)$$

If $P_1$ is the driver, but $P_2$ tends to "help" $P_1$ (Case III), the conditioning for self-locking is $P_1=\infty$. This will occur when the denominator of Equaton (9) becomes zero. I call such self-locking second-order self-locking, and it occurs whenever $$\tan \phi_2 \leq (f-f_2)/(1+ff_2) \approx f-f_2 \quad (11)$$

The full implications of second-order self-locking are explained in detail in U.S. Patent No. 2,973,660. It is seen from Equation (11) that I can eliminate second-order self-locking (which very often is an undesirable characteristic) by making $f_2$ sufficiently large.

In devices according to the present invention, I can also obtain a new property which I call third-order self-locking. If $P_1$ tends to drive the mechanism against $P_2$ (Case I), the condition for self-locking is that $P_1=\infty$. This will occur when the denominator of Equation (8) becomes zero. Third-order self-locking thus occurs when $$\tan \phi_2 \leq (f_2-f)/(1+ff_2) \approx f_2-f \quad (12)$$

Since $$(f_2-f)/(1+ff_2) = \tan(\text{arc tan } f_2 - \text{arc tan } f)$$

the above condition can also be written as $$\phi_2 \leq \text{arc tan } f_2 - \text{arc tan } f \quad (13)$$

Third-order self-locking can therefore only occur if $f_2$ is made extremely large. Whenever this property occurs, $P_1$ can never drive the mechanism against $P_2$, and neither can $P_2$ drive the mechanism against $P_1$. The only way of obtaining motion is by having $P_1$ and $P_2$ drive the mechanism simultaneously in the same direction (i.e., Case III).

One practical application of this is in safety devices, such as those used, for example, in punch presses, where it is desired to force the machine operator to withdraw both hands before the press is tripped. By using a mechanism with third-order self-locking, the operator can be forced to turn two different hand wheels simultaneously in order to actuate the press.

*Calculation of axial thrust*

Considering the triangle formed by the vectors N, F, and their resultant R in FIGURE 10, I have $$N = R \cos \theta \qquad (14)$$

Applying the law of sines to the triangle formed by $P_2$ and R, I have $$P_2 = \frac{\sin(\theta + \phi_2 - \theta_2)}{\sin(90° + \theta_2)} = \frac{\sin(\theta + \phi_2 - \theta_2)}{\cos \theta_2} \qquad (15)$$

Substituting (15) into (14) to eliminate R, I obtain $$\frac{N}{P_2} = \frac{\cos \theta \cos \theta_2}{\sin(\phi_2 + \theta - \theta_2)} \approx \frac{1}{\sin(\phi_2 + \theta - \theta_2)} \qquad (16)$$

The above equation applies for Case I operation. For Case III, the signs of the friction angles $\theta$ and $\theta_2$ must be reversed, and I obtain $$\frac{N}{P_2} = \frac{\cos \theta \cos \theta_2}{\sin(\phi_2 - \theta + \theta_2)} \approx \frac{1}{\sin(\phi_2 - \theta + \theta_2)} \qquad (17)$$

The above values of N represent the normal thrust forces acting on the worm teeth, i.e., tending to brake the teeth, and must be used when calculating the tooth stresses. While the axial thrust forces $V_1$ and $V_2$ acting on the thrust bearings are slightly smaller than N, the difference is very slight, so that, for practical engineering calculations, N can be used as the axial bearing thrust forces as well.

*Calculation of efficiency*

The efficiency $e$ for Class I operation is defined as $$e = \left| \frac{P_2 p_2}{P_1 p_1} \right| \qquad (18)$$

As shown in U.S. Patent No. 2,973,660, the ratio of the displacements $p_2/p_1$ equals $$\frac{p_2}{p_1} = -\frac{\sin \phi_1}{\sin \phi_2} \qquad (19)$$

Substituting (19) and (8) into (18), I obtain $$e = \frac{(1 + ff_2) + (f - f_2)/\tan \phi_2}{(1 - ff_1) + (f + f_1)/\tan \phi_1} \qquad (20)$$

For Class II operation, the efficiency (provided there is no self-locking) is defined as $$e = \left| \frac{P_1 p_1}{P_2 p_2} \right| \qquad (21)$$

Substituting (19) and (9) into (21), I obtain $$e = \frac{(1 - ff_1) - (f + f_1)/\tan \phi_1}{(1 + ff_2) - (f - f_2)/\tan \phi_2} \qquad (22)$$

For Class III operation, the efficiency $e$ has no meaning, since there is no output work. (Both forces $P_1$ and $P_2$ do work against the friction.) I can, however, calculate the relation between the forces $P_1$ and $P_2$ and define the force ratio $e^*$ as $$e^* = \frac{P_2}{P_1} \left| \frac{p_2}{p_1} \right| \qquad (23)$$

Substituting (19 and (9) into (23), I obtain $$e^* = \frac{(1 + ff_2) - (f - f_2)/\tan \phi_2}{(1 - ff_1) - (f + f_1)/\tan \phi_1} \qquad (24)$$

For a drive with ordinary self-locking, $e^*$ may assume any negative value, and can even be larger than unity. For second-order self-locking, $e^* = 0$.

*Numerical examples*

I will now present a number of numerical examples to illustrate the practical application of the above theory. All of the equations which I have derived above apply to the wedge system of FIGURE 7 and also to the mating-worm system of FIGURE 8. I have derived the above equations for this system, since it is the most complicated one, with the greatest number of friction surfaces. I can easily obtain the equations for the other simpler systems by setting either $f_1$ or $f_2$ equal to zero. Thus, if I set $f_1$ equal to zero, all the above equations apply to the systems of FIGURES 5 and 6. If I set $f_2$ equal to zero, all of the above equations apply to the systems of FIGURES 3 and 4. If I set both $f_1$ and $f_2$ equal to zero, all of the above equations apply to the systems of FIGURES 1 and 2, and become identical to the equations which I have derived in U.S. Patent No. 2,973,660.

Designing a mating-worm drive, by way of example, according to U.S. Patent No. 2,973,660, I assume a friction coefficient of $f = 0.16$ ($\theta = 9.1°$), and a safety factor for self-locking of 1.2. This means that $$\tan \phi_1 = f/1.2 = 0.133$$

and $\phi_1 = 7.6°$. Choosing a difference between the pitch angles $\phi_2 - \phi_1 = 3°$ by way of example, I obtain $\phi_2 = 10.6°$ and $\tan \phi_2 = 0.187$. For Case I operation, I obtain the efficiency $e$ from Equation (20) (setting $f_1 = f_2 = 0$) as $e = 84\%$. I obtain the side thrust N from Equation (16) (setting $\theta_2 = 0$) as $N = 3.0 P_2$, where $P_2$ is the load to be raised. When the load is to be lowered, I have Case III operation, and calculate $e^*$ from Equation (24) as $e^* = -73\%$, and the axial side thrust N from Equation (17) as $N = 38.1 P_2$.

This very large side thrust obtained when lowering the load is a serious drawback of the invention of U.S. Patent No. 2,973,660, a drawback which I am able to eliminate by means of the present invention. Designing, by way of example, a mating-worm drive according to one form of the present invention, I will set $f_2 = 0$ and $f_1 = 0.05$. This would be a worm drive as shown in FIGURE 4, having friction surfaces at the thrust bearings of the input worm.

I again assume a friction coefficient of $f = 0.16$ and a safety factor for self-locking of 1.2. This means that $\tan \phi_1 = (f + f_1)/1.2 = 0.175$ and $\phi_1 = 9.9°$. It is interesting to note that I am able to obtain self-locking even though $\phi_1$ is larger than the friction angle $\theta$ acting at the worm threads. This is because I have introduced the additional friction $f_1$. Again, choosing $\phi_2 - \phi_1 = 3°$, I obtain $\phi_2 = 12.9°$ and $\tan \phi_2 = 0.229$.

For Case I operation, I obtain an efficiency $e = 78\%$ and a side thrust $N = 2.67 P_2$. For Case III operation (lowering the load, I obtain $e^* = -144\%$ and $N = 15.0 P_2$.

The advantages of this form of the present invention will now be evident. By introducing a small amount of friction $f_1$, I have succeeded in reducing the side thrust for lowering the load from 38.1 $P_2$ to 15.0 $P_2$. In addition, I have eliminated the need for one pair of expensive anti-friction bearings. In addition, comparison of the $e^*$ values shows that only half the input force will now be required to lower the load than heretofore. The efficiency $e$ for raising the load has dropped slightly (from 84% to 78%), but is still much higher than that of conventional self-locking worm-gear transmissions (which is usually 30% to 45%).

The exact value of $f_1$ chosen is a matter of compromise. If $f_1$ is increased further, the side thrust N will be reduced even more, but at the cost of a further drop in the efficiency $e$. For example, if I choose a value of $f_1 = 0.16$, I can increase $\phi_1$ to 14.9° and still obtain self-locking with a safety factor of 1.2. Using $\phi_2 = 17.9°$, I obtain an efficiency $e = 69\%$ and a side thrust for lowering the load $N = 6.5 P_2$.

I will now design, by way of example, a mating-worm drive according to a second form of the present invention. I will choose $f_1 = 0$ and $f_2 = 0.05$ ($\theta_2 = 2.9°$). This would be a mating-worm drive as illustrated in FIGURE 6, having friction surfaces at the thrust bearings of the output worm.

I again assume a friction coefficient of $f=0.16$ ($\theta=9.1°$) and a safety factor for self-locking of 1.2. This results in tan $\phi_1=f/1.2=0.133$, $\phi_1=7.6°$, $\phi_2=10.6°$, and tan $\phi_2=0.187$.

For Case I operation, I obtain $e=72\%$ and $N=3.45P_2$. For Case III operation (lowering the load), I obtain $e^*=-210\%$ and $N=13.0P_2$.

This second form of the present invention is therefore even more effective than the first form in reducing the side thrust, and especially in reducing the force required to lower the load. However, the efficiency $e$ is somewhat lower. Again, the exact value of $f_2$ chosen is a matter of compromise. Larger values of $f_2$ producee lower side thrust N and higher $e^*$, but also reduce the efficiency $e$.

I will now design, by way of example, a mating-worm drive according to a third form of the present invention, using both $f_1$ and $f_2$. This would be a worm drive illustrated in FIGURE 8, having friction thrust bearings at both input and output worms.

I choose $f_1=f_2=0.05$ ($\theta_1=\theta_2=2.9°$), and assume $f=0.16(\theta=9.1°)$, and a safety factor for self-locking of 1.2. This results in tan $\phi_1=(f+f_1)/1.2=0.175$, $\phi_1=9.9°$, $\phi_2=12.9°$, and tan $\phi_2=0.229$.

For Case I operation, I obtain $e=68\%$ and $N=3.0P_2$. For Case III operation (lowering the load), I obtain $e^*=-254\%$ and $N=8.5P_2$.

The advantage of this third form of the present invention is that the side thrust is further reduced, and that all expensive anti-friction bearings are eliminated. Again, the exact values of $f_1$ and $f_2$ are a compromise between reduced side thrust and reduced efficiency. Values less than 0.01 will bring little benefit.

In all the three forms of the present invention, the difference between the pitch angles $\phi_2-\phi_1$ should be fairly small, as otherwise the efficiency is decreased drastically. Therefore, if high efficiency is desird, $\phi_2-\phi_1$ should be made less than 15°, and preferably less than 5°.

*Application of equations to an almost self-locking drive according to the present invention*

In automobile steering systems, the motion of the steering wheel is usually transmitted to the steering linkage by means of a conventional worm drive. This worm drive is made almost self-locking, to avoid road shock from being felt excessively at the steering wheel. (The drive cannot be made completely self-locking, for then the wheels would not straighten out by themselves after rounding a curve.) Such conventional worm drives usually have an efficiency of slightly higher than 50%.

Using instead a worm drive according to the present invention, I choose, by way of example, $\phi_1=45°$, $\phi_2=47°$, $f_1=0.50$ and $f_2=0.05$, and assume $f=0.16$. This drive has an efficiency of 70%. In the reverse direction, the efficiency (as given by Equation 22) is only 28%, so that the transmittal of road shock to the steering wheel is greatly reduced.

*Self-locking drive for shafts 90° apart*

Sometimes it is desired to connect two shafts that are 90° apart by means of a self-locking drive. A conventional worm and worm gear can be used for this purpose. However, in order to produce self-locking, the worm pitch angle must be very small (smaller than the angle of friction), and this usually produces a very large speed-reduction ratio. Very often, such a large speed-reduction is not desirable, as for example in mechanical computing mechanisms where it is often preferable to obtain self-locking but without any speed reduction.

Figure 18:
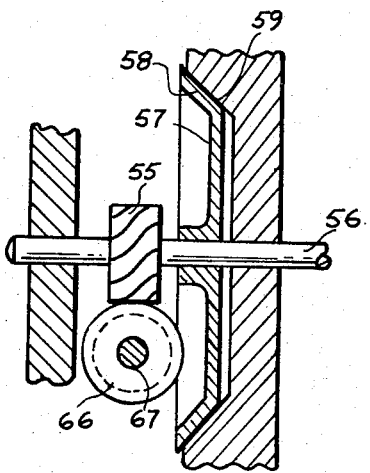
FIGURE 18 is an elevation in section of a self-locking gear combination connecting two shafts positioned at 90 degrees to one another.

Applying the principles of the present invention, I have constructed a worm drive that is self-locking and yet has a 1:1 speed ratio. This drive is shown diagrammatically in FIGURE 18. The driving worm 55 has a pitch angle $\phi_1=45°$. The driven worm 66 has a pitch angle $\phi_2=135°$ (i.e., also 45°), so that the angle between the shafts 56 and 67 is 90°. To obtain self-locking in spite of the very high pitch angle $\phi_1$, I make use of a very large $f_1$, such as $f_1=0.9$, so that $f+f_1$ will be larger than tan $\phi_1$. This large $f_1$ is obtained by means of a very large friction disc 57 rigidly connected to the input shaft 56, with its conically-shaped surface 58 bearing against bearing surface 59. The device is thus a special case of the forms of the invention illustrated in FIGURE 4 or FIGURE 8. The efficiency of the device of FIGURE 18 is not appreciably higher than that of conventional self-locking worm devices, namely less than 50%, because of the high value of $\phi_2-\phi_1$. Thus, the advantage of the device is not in its efficiency, but in the fact that I can achieve self-locking and yet obtain a 1:1 speed ratio.

It will be obvious that I can apply the above principle also where the angle between the shafts is not exactly 90°, or where a speed ratio other than 1:1 is needed. If the angle between the shafts is less than 90°, the efficiency will be correspondingly higher.

The device illustrated in FIGURE 18 will exhibit self-locking only if the load tends to turn the gear 66 clockwise. If the load acts on gear 66 in the counterclockwise direction, the drive will turn freely without self-locking, since the axial thrust will push the gear 55 to the left, so that the large $f_1$ will not be effective. I am thus able to build a drive which has self-locking in one direction, but no self-locking in the other direction of rotation. If I wish self-locking in both directions of rotation, I must add a second friction disc 57 at the left side of gear 55 bearing against a second bearing surface similar to surface 59.

*Mating-worm drive with axial play*

In order to obtain very high efficiency, I must make the difference between the worm pitch angles $\phi_2-\phi_1$ as small as possible, as was pointed out in U.S. Patent No. 2,973,660. However, when this is done, I usually obtain second-order self-locking, since $\phi_1$ and $\phi_2$ are almost equal, so that, if $\phi_1$ is smaller than the friction angle, $\phi_2$ will also usually be smaller than the friction angle. Unfortunately, it has not been possible to utilize such mating-worm drives with second-order self-locking for most applications, since it is impossible to lower the load as long as such self-locking exists. Even if $\phi_2$ is not so small as to cause second-order self-locking, a small $\phi_2-\phi_1$ will usually produce a very small value of $e^*$, i.e., will necessitate the application of a very large force $P_1$ in order to lower the load $P_2$.

Figure 14:
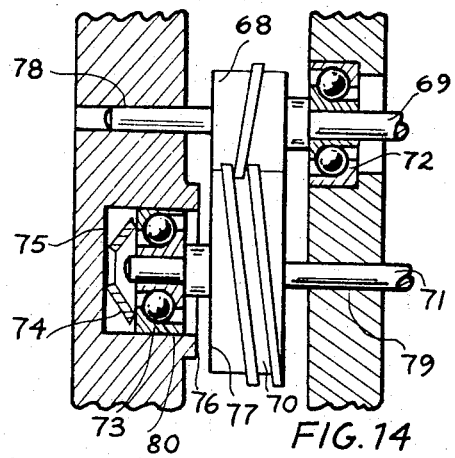
FIGURE 14 is an elevation in section of a worm combination according to one form of the invention.

The principles of the present invention can be utilized in order to overcome the above difficulty. FIGURE 14 shows a mating-worm drive comprising an input worm 68 mounted on input shaft 69 and an output worm 70 mounted on output shaft 71. The input shaft 69 is supported by an antifriction bearing 72 on one side, and by an ordinary sliding bearing 78 on its second side. The antifriction bearing 72 should be of a type capable of withstanding thrust loads in addition to radial loads, such as, for example, a deep-groove ball bearing, an angular-contact ball bearing, or a tapered or spherical roller bearing. Provided the load $P_2$ connected to the output shaft 71 acts always so as to produce a clockwise torque on output shaft 71, the side thrust on input shaft 69 will always act to the right, so that one antifriction bearing is sufficient for the input shaft 69, and the second bearing 78 can be an inexpensive sliding bearing. If the output load $P_2$ is liable to act in both directions of rotation, then the second bearing 78 must also be an antifriction bearing.

The output shaft 71 is supported by an antifriction bearing 73 similar to bearing 72, and by a sliding bearing 79 similar to bearing 78. The bearing 73 is mounted in the housing bore 80 with a sliding fit, so that it can slide freely in the axial direction. The output worm 70 is thus mounted with some axial play. A spring member 74 is inserted between bearing 73 and surface 75 so as to take up this axial play. This spring member is preferably of the Belleville spring type (i.e., a cupped washer), since such springs take up less space than equivalent ordinary coiled springs.

The parts are so dimensioned that, after assembly, there will be left a small clearance between the thrust surface 76 and the worm edge 77. This thrust surface 76 could be a narrow annular lip machined on the bearing housing, as shown in the FIGURE 14. If found preferable, the thrust surface could instead be machined on the edge of the worm.

If the output load $P_2$ is liable to act in both directions of rotation, it will be necessary to add a second antifriction bearing similar to bearing 73, a second spring member simliar to spring member 74, and a second thrust surface similar to 76, at the right side of the worm 70.

Th pitch angles $\phi_1$ and $\phi_2$ of the two worms can be chosen for very high efficiency, in the 75% to 95% range, by making the difference $\phi_2 - \phi_1$ very small, namely less than 10° but preferably less than 2° or 3°. The drive would therefore suffer from second-order self-locking under ordinary conditions, or at least from a low value of $e^*$.

The mode of operation of the device can now be explained. When the load $P_2$ is being raised, the axial side thrust is fairly small, as demonstrated by the numerical example presented above for a device according to U.S. Patent No. 2,973,660. The small side thrust is not sufficient to push the output shaft 71 to the left to any great extent against the spring member 74, so that the worm edge 77 will not come into contact with the thrust surface 76. Since the efficiency is very high, it will be very easy to raise the load.

When the input shaft is turned in the counterclockwise direction in order to lower the load, it is found that, for the first moment, this cannot be accomplished because of the second-order self-locking, or, if there is no second-order self-locking, it will still be difficult to lower the load because of the low $e^*$. However, as soon as it is attempted to lower the load, the side thrust will increase by several times. For example, in the numerical example given above, the side thrust for lowering the load was 13 times the side thrust for raising the load. This greatly increased side thrust will therefore be sufficient to overcome the resistance offered by the spring member 74 and push the worm 70 to the left until worm edge 77 contacts the thrust surface 76. This thrust surface, having a fairly large diameter, will produce a fairly high value of bearing friction $f_2$, so that the device now operates according to the second form of the present invention, i.e., with $f_1 = 0$ but $f_2 > 0$. The large value of $f_2$ will cancel any tendency towards second-order self-locking, and will also produce a very large value of $e^*$, so that it will be extremely easy to lower the load.

It will be clear that, in a device such as that of FIGURE 14, the side thrust that is developed when lowering the load is not given by Equation (17) any more, but is determined by the spring constant of the spring member 74 and by the size of the small clearance between the thrust surface 76 and the worm edge 77. Equation (17) represents the largest side thrust that could be developed if there were no spring member and bearing friction $f_2$. In actual practice, the side thrust developed will only be equal to the force necessary to compress the spring sufficiently to make the worm edge 77 contact the thrust surface 76.

The above principle of operation can also be applied to other mating-worm drives according to the present invention. For example, FIGURE 15 shows a drive similar to that of FIGURE 14, except that the antifriction bearing 72 of the input shaft 69 has been replaced by a sliding thrust bearing 62. The device thus exhibits bearing friction $f_1$ for raising the load, but both $f_1$ and $f_2$ for lowering the load, so that there will be a very high efficiency for raising the load, and yet only a small input force $P_1$ is needed to lower the load.

Figure 16:
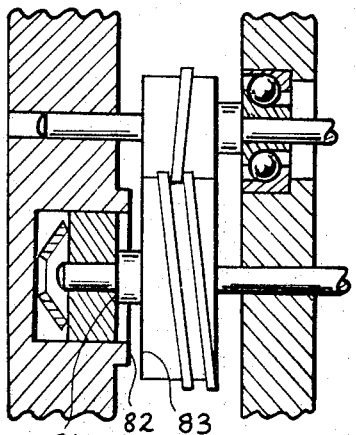
FIGURE 16 is an elevation in section of a worm combination according to a third form of the invention.

FIGURE 16 shows a drive similar to that of FIGURE 14, except that the antifriction bearing 73 at the output shaft has been replaced by a sliding thrust bearing 81. Since the average diameter of this thrust bearing is very small compared to the worm diameter, the reflected $f_2$ will be very small when the load is raised. When the load is lowered, the thrust surface 82, which has a large diameter, will contact the worm edge 83, resulting in a very large value of $f_2$ and therefore a high $e^*$.

Figure 17:
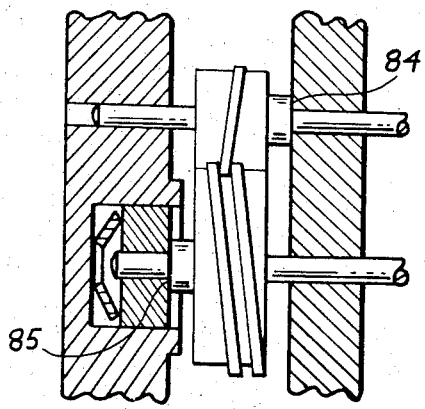
FIGURE 17 is an elevation in section of a worm combination according to a fourth form of the invention.

Finally, FIGURE 17 shows a device similar to that of FIGURE 14, but with both antifriction bearings 72 and 73 replaced by sliding thrust bearings 84 and 85 respectively. Again, $f_1$ and $f_2$ would ordinarily be made small when raising the load, in order to obtain a reasonably high efficiency. When the load is lowered, $f_2$ would be very large. While this device would ordinarily have a lower efficiency than that of FIGURE 14, this is compensated for by the fact that the need for expensive antifriction bearings is eliminated.

*Other embodiments of the invention*

Figures 19, 20, 21:
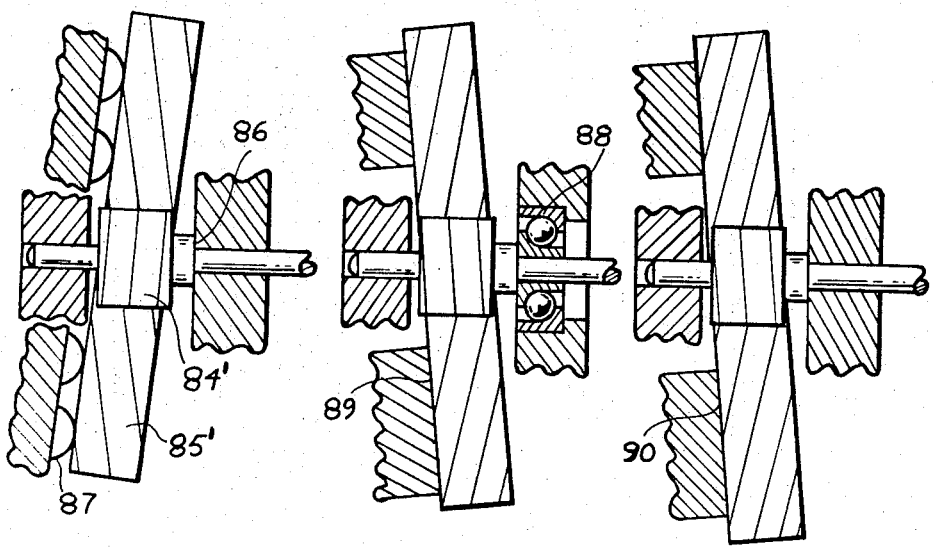
FIGURE 19 is a diagrammatic plan view in section showing one form of the invention as applied to reciprocating motion.
FIGURE 20 is a diagramamtic plan view in section showing a second form of the invention as applied to reciprocating motion.
FIGURE 21 is a diagramamtic plan view in section showing a third form of the invention as applied to reciprocating motion.

It will be obvious that the principles of the present invention can also be applied to gear drives other than mating-worm drives. For example, FIGURE 19 shows an inclined-plane transmission useful for changing rotating motion to linear motion, or for changing linear motion to rotating motion. The drive comprises a worm 84' driving a rack 85' with diagonal teeth. The worm is supported by a sliding thrust bearing 86, while the rack is supported by an antifriction thrust bearing consisting of several rollers 87. The device thus exhibits $f_1$ but no $f_2$. The same equations set forth above apply for this drive also.

FIGURE 20 shows a drive similar to that of FIGURE 19, except that the input worm has an antifriction thrust bearing 88, while the rack is supported by a sliding thrust surface 89. This device thus exhibits $f_2$ but no $f_1$.

FIGURE 21 shows a drive similar to that of FIGURE 19, except that the rollers 87 have been replaced by a sliding thrust surface 90. This device thus exhibits both $f_1$ and $f_2$.

Whereas the worm of FIGURE 19 has a left-handed thread, the worms of FIGURES 20 and 21 are shown, by way of example, with a right-handed thread. The principle of operation is the same, except that the side thrust acts in the opposite direction, depending on the direction of rotation.

Figure 22:
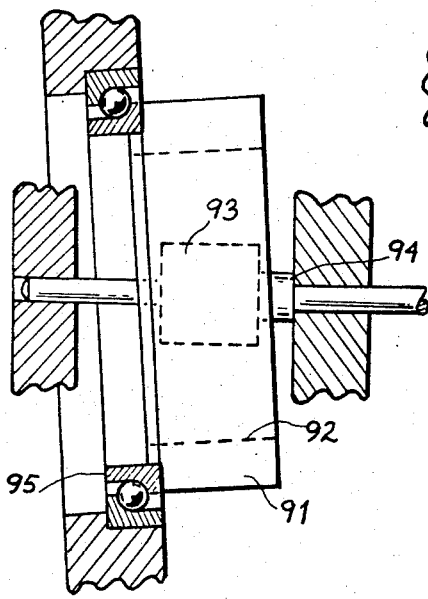
FIGURE 22 is an elevation in section showing one form of the invention as applied to an internal gear combination.
Figure 23:
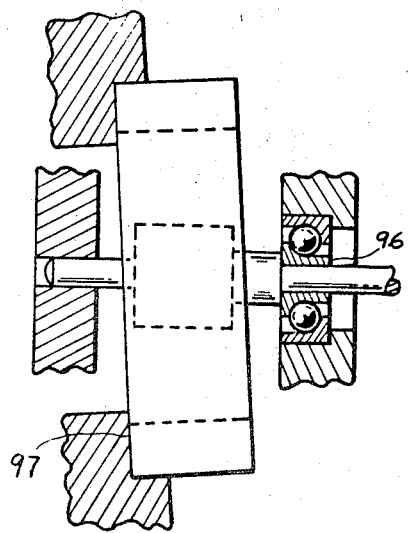
FIGURE 23 is an elevation in section showing a second form of the invention as applied to an internal gear combination.

FIGURES 22 and 23 how two internal worm drives, according to the present invention. FIGURE 22 shows an internal worm 91 with an internal worm thread 92 driven by a regular (external) worm 93. The worm 93 is preferably barrel shaped, to make better contact with the internal worm. Both worms must have threads in the same direction, either right-handed or left-handed. Input worm 93 is supported by sliding thrust surface 94, while output worm 91 is supported by antifriction bearing 95. The device thus exhibits $f_1$ but no $f_2$. FIGURE 23 is similar to FIGURE 22, except that the input worm is supported by an antifriction bearing 96, while the output worm is supported by a sliding bearing surface 97, producing $f_2$ but no $f_1$.

Figure 24:
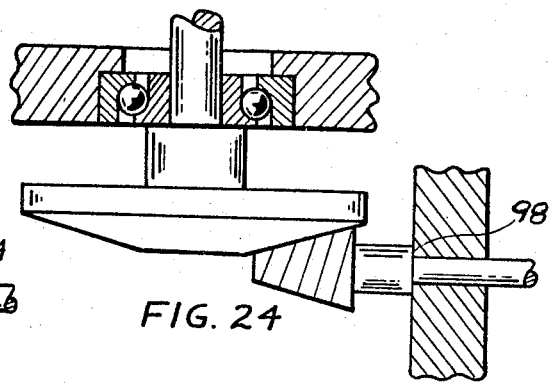
FIGURE 24 is a diagrammatic plan view in section showing one form of the invention as applied to a bevel gear combination.
Figure 25:
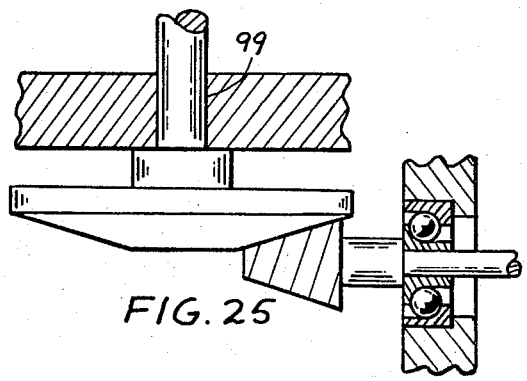
FIGURE 25 is a diagrammatic plan view in section showing a second form of the invention as applied to a bevel gear combination.
Figure 26:
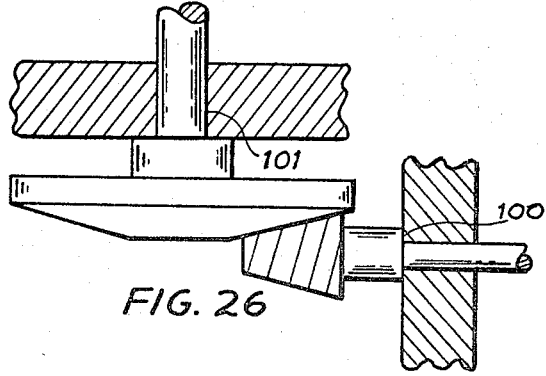
FIGURE 26 is a diagrammatic plan view in section showing a third form of the invention as applied to a bevel gear combination.

FIGURES 24, 25 and 26 show worm drives according to the present invention, but with the worm threads formed on conical surfaces. These drives are analogous to bevel-gear drives. The device of FIGURE 24 has a sliding thrust surface 98 at the input worm, and thus exhibits $f_1$ but no $f_2$. The device of FIGURE 25 has a sliding thrust surface 99 at the output worm, and thus exhibits $f_2$ but no $f_1$. (Surface 99, although representing a radial bearing, absorbs the axial side thrust produced by the input worm.) The device of FIGURE 26 has sliding thrust surfaces 100 and 101 at both worms, and thus exhibits both $f_1$ and $f_2$.

In all the devices illustrated in FIGURES 14 to 26, only one thrust bearing is shown for each gear, assuming that the load acts in one direction only. As already explained above, if the load is liable to act in both directions, then similar thrust bearings must also be mounted on the other side of each gear.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

In this specification and in the attached claims, the term "the pitch angle of the worm threads" is defined as the angle between the worm threads and the direction of motion of any point on the worm threads, as also illustrated in FIGURE 2.

Having thus described my invention, what I claim as new and desire to secure by Letters Patent is:

1. In a self-locking motion transmission device, an input element adapted to move and transmit motion, having an input wedge surface angularly disposed to the direction of motion of the input element and thus defining an input wedge angle; a bearing friction surface guiding said input element with a coefficient of sliding bearing friction between them, said bearing friction producing a reflected coefficient of input-element bearing friction at the input wedge surface having a value greater than 0.01; and an output element adapted to move and be driven by the input element, having an output wedge surface angularly disposed to the direction of motion of the output element and thus defining an output wedge angle; said input wedge surface and said output wedge surface being in engagement during motion transmission with a coefficient of friction between them; the tangent of said input wedge angle being equal to or less than the sum of said coefficient of friction between the two wedge surfaces and said reflected coefficient of input-element bearing friction at the input wedge surface; and said output wedge angle being greater than said input wedge angle by an amount which is not in excess of 15 degrees.

2. A device of claim 1, in which the tangent of the output wedge angle is equal to or greater than said coefficient of friction between the two wedge surfaces, the device having ordinary self-locking properties.

3. A device of claim 1, in which the tangent of the output wedge angle is less than said coefficient of friction between the two wedge surfaces, the device having second-order self-locking properties.

4. A device of claim 1, in which the input element and the output element both move lineally.

5. A device of claim 1, in which either one of the input or output elements is a worm having worm threads and the other of the input and output elements is a rack having diagonal teeth which mesh with the worm threads.

6. A device of claim 5, in which the tangent of the output wedge angle is equal to or greater than said coefficient of friction between the two wedge surfaces, the device having ordinary self-locking properties.

7. A device of claim 5, in which the tangent of the output wedge angle is less than said coefficient of friction between the two wedge surfaces, the device having second-order self-locking.

8. A motion transmitting device comprising: an input worm having worm threads on its circumferential surface; a bearing friction surface supporting said input worm with a coefficient of sliding bearing friction between them, said bearing friction producing a reflected coefficient of input-worm bearing friction at the input worm threads having a value greater than 0.01; and an output worm having worm threads on its circumferential surface which are constantly in mesh with the worm threads on the input worm and establishing a coefficient of friction between them; the tangent of the pitch angle of the worm threads on the input worm being less than the sum of said coefficient of friction between the two worm threads and said reflected coefficient of input-worm bearing friction at the input worm threads; and the pitch angle of the worm threads on the output worm being greater than the pitch angle of the worm threads on the input worm by an amount not exceeding 15 degrees.

9. A device of claim 8, in which the tangent of the pitch angle of the worm threads on the input worm is greater than said coefficient of friction between the two worm threads.

10. A device of claim 8, in which one of the two worms is internal and the other worm is external, the two worms having threads in the same direction.

11. A device of claim 8, in which each of the two worms has threads on a generally conical surface.

12. A device of claim 8, in which the tangent of the pitch angle of the worm threads on the output worm is equal to or greater than said coefficient of friction between the two worm threads, the device having ordinary self-locking properties.

13. A device of claim 12, in which each of the two worms has threads on a generally conical surface.

14. A device of claim 8, in which the tangent of the pitch angle of the worm threads on the output worm is less than said coefficient of friction between the two worm threads, the device having second-order self-locking properties.

15. A device of claim 14, in which each of the two worms has threads on a generally conical surface.

16. A motion transmitting device comprising: an input worm having worm threads on its circumferential surface; a bearing friction surface supporting said input worm with a coefficient of sliding bearing friction between them, said bearing friction producing a reflected coefficient of input worm bearing friction at the input worm threads having a value greater than 0.01; and an output worm having worm threads on its circumferential surface which are constantly in mesh with the worm threads on the input worm and establishing a coefficient of friction between them; the tangent of the pitch angle of the worm threads on the input worm being greater than the sum of said coefficient of friction between the two worm threads and said reflected coefficient of input-worm bearing friction at the input worm threads by a factor which does not exceed 1.3; and the pitch angle of the worm threads on the output worm being greater than the pitch angle of the worm threads on the input worm by an amount not exceeding 15 degrees.

17. A device of claim 16, in which each of the two worms has threads on a generally conical surface.

18. In a self-locking motion transmission device, an input element adapted to move and transmit motion, having an input wedge surface angularly disposed to the direction of motion of the input element and thus defining an input wedge angle; an output element adapted to move and be driven by the input element, having an output wedge surface angularly disposed to the direction of motion of the output element and thus defining an output wedge angle; and a bearing friction surface guiding said output element with a coefficient of sliding bearing friction between them, said bearing friction producing a reflected coefficient of output-element bearing friction at the output wedge surface having a value greater than 0.01; said input wedge surface and said output wedge surface being in engagement during motion transmission with a coefficient of friction between them; the tangent of said input wedge angle being equal to or less than said coefficient of friction between the two wedge surfaces; and said output wedge angle being greater than said input wedge angle by an amount which is not in excess of 15 degrees.

19. A device of claim 18, in which the input element and the output element both move lineally.

20. A device of claim 18, in which the output wedge angle is less than the difference between the arc tangent of said reflected coefficient of output-element bearing friction at the output wedge surface and the arc tangent of said coefficient of friction between the two wedge surfaces, the device having third-order self-locking properties.

21. A device of claim 18, in which either one of the input or output elements is a worm having worm threads and the other of the input and output elements is a rack having diagonal teeth which mesh with the worm threads.

22. A device of claim 21, in which the output wedge angle is less than the difference between the arc tangent of said reflected coefficient of output-element bearing friction at the output wedge surface and the arc tangent of said coefficient of friction between the two wedge surfaces, the device having third-order self-locking properties.

23. A motion transmitting device comprising: an input worm having worm threads on its circumferential surface; an output worm having worm threads on its circumferential surface which are constantly in mesh with the worm threads on the input worm and establishing a coefficient of friction between them; and a bearing friction surface supporting said output worm with a coefficient of sliding bearing friction between them, said bearing friction producing a reflected coefficinet of output-worm bearing friction at the output worm threads having a value greater than 0.01; the tangent of the pitch angle of the worm threads on the input worm being less than said coefficient of friction between the two worm threads; and the pitch angle of the worm threads on the output worm being greater than the pitch angle of the worm threads on the input worm by an amount not exceeding 15 degrees.

24. A device of claim 23, in which one of the worms is internal and the other worm is external, the two worms having threads in the same direction.

25. A device of claim 23, in which each of the two worms has threads on a generally conical surface.

26. A device of claim 23, in which the pitch angle of the worm threads on the output worm is less than the difference between the arc tangent of said reflected coefficient of output-worm bearing friction at the output worm threads and the arc tangent of said coefficient of friction between the two worm threads, the device having third-order self-locking properties.

27. A device of claim 26, in which one of the worms is internal and the other worm is external, the two worms having threads in the same direction.

28. A device of claim 26, in which each of the two worms has threads on a generally conical surface.

29. A motion transmitting device comprising: an input worm having worm threads on its circumferential surface; an output worm having worm threads on its circumferential surface which are constantly in mesh with the worm threads on the input worm and establishing a coefficient of friction between them; and a bearing friction surface supporting said output worm with a coefficient of sliding bearing friction between them, said bearing friction producing a reflected coefficient of output-worm bearing friction at the output worm threads having a value greater than 0.01; the tangent of the pitch angle of the worm threads on the input worm being greater than said coefficient of friction between the two worm threads by a factor which does not exceed 1.3; and the pitch angle of the worm threads on the output worm being greater than the pitch angle of the worm threads on the input worm by an amount not exceeding 15 degrees.

30. A device of claim 29, in which each of the two worms has threads on a generally conical surface.

31. In a self-locking motion transmission device, an input element adapted to move and transmit motion, having an input wedge surface angularly disposed to the direction of motion of the input element and thus defining an input wedge angle; a bearing friction surface guiding said input element with a coefficient of sliding bearing friction between them, said bearing friction producing a reflected coefficient of input-element bearing friction at the input wedge surface having a value greater than 0.01; an output element adapted to move and be driven by the input element, having an output wedge surface angularly disposed to the direction of motion of the output element and thus defining an output wedge angle; and a second bearing friction surface guiding said output element with a second coefficient of sliding bearing friction between them, said bearing friction producing a reflected coefficient of output-element bearing friction at the output wedge surface having a value greater than 0.01; said input wedge surface and said output wedge surface being in engagement during motion transmission with a coefficient of friction between them; the tangent of said input wedge angle being equal to or less than the sum of said coefficient of friction between the two wedge surfaces and said reflected coefficient of input-element bearing friction at the input wedge surface; and said output wedge angle being greater than said input wedge angle by an amount which is not in excess of 15 degrees.

32. A device of claim 31, in which the input element and the output element both move lineally.

33. A device of claim 31, in which either one of the input or output elements is a worm having worm threads and the other of the input and output elements is a rack having diagonal teeth which mesh with the worm threads.

34. A motion transmitting device comprising: an input worm having worm threads on its circumferential surface; a bearing friction surface supporting said input worm with a coefficient of sliding bearing friction between them, said bearing friction producing a reflected coefficient of input-worm bearing friction at the input worm threads having a value greater than 0.01; and output worm having worm threads on its circumferential surface which are constantly in mesh with the worm threads on the input worm and establishing a coefficient of friction between them; and a second bearing friction surface supporting said output worm with a second coefficient of sliding bearing friction between them, said bearing friction producing a reflected coefficient of output-worm bearing friction at the output worm threads having a value greater than 0.01; the tangent of the pitch angle of the worm threads on the input worm being less than the sum of said coefficient of friction between the two worm threads and said reflected coefficient of input-worm bearing friction at the input worm threads; and the pitch angle of the worm threads on the output worm being greater than the pitch angle of the worm threads on the input worm by an amount not exceeding 15 degrees.

35. A device of claim 34, in which each of the two worms has threads on a generally conical surface.

36. A motion transmitting device comprising: an input worm having worm threads on its circumferential surface; a bearing friction surface supporting said input worm with a coefficient of sliding bearing friction between them, said bearing friction producing a reflected coefficient of input-worm bearing friction at the input worm threads having a value greater than 0.01; an output worm having worm threads on its circumferential surface which are constantly in mesh with the worm threads on the input worm and establishing a coefficient of friction between them; and a second bearing friction surface supporting said output worm with a second coefficient of sliding friction between them, said sliding bearing friction producing a reflected coefficient of output-worm bearing friction at the output worm threads having a value greater than 0.01; the tangent of the pitch angle of the worm threads on the input worm being greater than the sum of said coefficient of friction between the two worm threads and said reflected coefficient of input-worm bearing friction at the input worm threads by a factor which does not exceed 1.3; and the pitch angle of the worm threads on the output worm being greater than the pitch angle of the worm threads on the input worm by an amount not exceeding 15 degrees.

37. In a self-locking gear transmission, an input gear, an output gear mounted with some axial play and being constantly in mesh with the input gear, elastic means for limiting the axial motion of the output gear, and a thrust surface mounted at a distance from one side of the output gear so that said thrust surface rubs against said side of the output gear when the axial thrust of the output gear exceeds a given value.

38. A motion transmitting device comprising: an input worm having worm threads on its circumferential surface; an output worm mounted with some axial play and having worm threads on its circumferential surface which are constantly in mesh with the worm threads on the input worm and establishing a coefficient of friction between them; the tangent of the pitch angle of the worm threads on the input worm being less than said coefficient of friction; and the pitch angle of the worm threads on the output worm being greater than the pitch angle of the worm threads on the input worm by an amount not exceeding 10 degrees; an antifriction bearing transmitting the axial thrust of the input worm; a second antifriction bearing transmitting the axial thrust of the output worm; a spring member taking up said axial play of the output worm and exerting an axial force which opposes the axial thrust generated by the output worm when the input worm is being turned against the load; and a thrust surface mounted at a distance from the edge of the output worm sufficient to prevent contact with the output worm when the input worm is being turned against the load, but permitting contact with the output worm when the input worm is being turned with the load.

39. A motion transmitting device comprising: an input worm having worm threads on its circumferential surface; a bearing friction surface supporting said input worm with a coefficient of sliding bearing friction between them, said bearing friction producing a reflected coefficient of input-worm bearing friction at the input worm threads having a value greater than 0.01; an output worm mounted with some axial play and having worm threads on its circumferential surface which are constantly in mesh with the worm threads on the input worm and establishing a coefficient of friction between them; the tangent of the pitch angle of the worm threads on the input worm being less than the sum of said coefficient of friction between the two worm threads and said reflected coefficient of input-worm bearing friction at the input worm threads; and the pitch angle of the worm threads on the output worm being greater than the pitch angle of the worm threads on the input worm by an amount not exceeding 10 degrees; an antifriction bearing transmitting the axial thrust of the output worm; a spring member taking up said axial play of the output worm and exerting an axial force which opposes the axial thrust generated by the output worm when the input worm is being turned against the load; and a thrust surface mounted at a distance from the edge of the output worm sufficient to prevent contact with the output worm when the input worm is being turned against the load, but permitting contact with the output worm when the input worm is being turned with the load.

40. A motion transmitting device comprising: an input worm having worm threads on its circumferential surface; an output worm mounted with some axial play and having worm threads on its circumferential surface which are constantly in mesh with the worm threads on the input worm and establishing a coefficient of friction between them; an antifriction bearing transmitting the axial thrust of the input worm; a bearing friction surface supporting the output worm with a coefficient of sliding bearing friction between them, said bearing friction producing a reflected coefficient of output-worm bearing friction at the output worm threads having a value greater than 0.01; the tangent of the pitch angle of the worm threads on the input worm being less than said coefficient of friction between the two worm threads; and the pitch angle of the worm threads on the output worm being greater tahn the pitch angle of the worm threads on the input worm by an amount not exceeding 10 degrees; a spring member taking up said axial play of the output worm and exerting an axial force which opposes the axial thrust generated by the output worm when the input worm is being turned against the load; and a thrust surface mounted at a distance from the edge of the output worm sufficient to prevent contact with the output worm when the input worm is being turned against the load, but permitting contact with the output worm when the input worm is being turned with the load.

41. A motion transmitting device comprising: an input worm having worm threads on its circumferential surface; a bearing friction surface supporting said input worm with a coefficient of sliding bearing friction between them, said bearing friction producing a reflected coefficient of input-worm bearing friction at the input worm threads having a value greater than 0.01; an output worm mounted with some axial play and having worm threads on its circumferential surface which are constantly in mesh with the worm threads on the input worm and establishing a coefficient of friction between them; a second bearing friction surface supporting said output worm with a second coefficient of sliding bearing friction between them, said bearing friction producing a reflected coefficient of output-worm bearing friction at the output worm threads having a value greater than 0.01; the tangent of the pitch angle of the worm threads on the input worm being less than the sum of said coefficient of friction between the two worm threads and said reflected coefficient of input-worm bearing friction at the input worm threads; and the pitch angle of the worm threads on the output worm being greater than the pitch angle of the worm threads on the input worm by an amount not exceeding 10 degrees; a spring member taking up said axial play of the output worm and exerting an axial force which opposes the axial thrust generated by the output worm when the input worm is being turned against the load; and a thrust surface mounted at a distance from the edge of the output worm sufficient to prevent contact with the output worm when the input worm is being turned against the load, but permitting contact with the output worm when the input worm is being turned with the load.

References Cited

UNITED STATES PATENTS

| | | | |
|---|---|---|---|
| 1,948,795 | 2/1934 | Merritt | 74—458 |
| 2,192,188 | 3/1940 | Green | 74—458 X |
| 2,273,784 | 2/1942 | Kahl | 74—458 X |
| 2,489,077 | 11/1949 | Boyles | 74—458 |
| 2,851,137 | 9/1958 | Gravenstine | 74—425 X |
| 2,908,226 | 10/1959 | Rich et al. | |
| 2,973,660 | 3/1961 | Popper | 74—424.5 |
| 3,067,627 | 12/1962 | Pickles | 74—425 |
| 3,289,489 | 12/1966 | Georgiev | 74—458 X |

DONLEY J. STOCKING, *Primary Examiner.*

L. H. GERIN, *Assistant Examiner.*